United States Patent Office 2,868,791
Patented Jan. 13, 1959

2,868,791

PROCESS FOR THE PRODUCTION OF SUBSTITUTED PIPERAZINES

Arthur B. Steele, Pittsburgh, Pa., assignor to Union Carbide Corporation, a corporation of New York No Drawing. Application October 19, 1954
Serial No. 463,330

11 Claims. (Cl. 260—268)

The present invention relates to a process for the preparation of substituted piperazines and has for an object the provision of a novel process for the preparation of substituted piperazines. More particularly, the process of this invention is directed to the production of substituted piperazines obtained by the reaction of an aliphatic secondary amine containing at least one 2-hydroxyethyl group and carbon dioxide under conditions of heat and pressure.

The process of this invention is based on the discovery that aliphatic secondary amines containing at least one 2-hydroxyethyl group and carbon dioxide react under the influence of an elevated temperature and elevated pressure to provide the corresponding N,N'-disubstituted piperazines. More particularly, the process of this invention comprises heating a reaction mixture comprising carbon dioxide and an aliphatic secondary amine containing at least one 2-hydroxyethyl group to an elevated temperature of at least 110° C. under a superatmospheric pressure of at least 150 pounds per square inch absolute. The aliphatic secondary amines containing at least one 2-hydroxyethyl group are the N-substituted ethanol amines wherein one hydrogen atom is replaced by an alkyl or hydroxyalkyl group.

The reaction whereby the N,N'-disubstituted piperazines are prepared in accordance with the process of this invention can be illustrated by the following series of general equations:

I(a) In the presence of water:

I(b) In the absence of water:

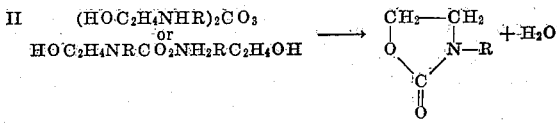

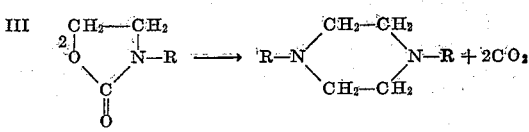

wherein R represents an alkyl or hydroxyalkyl radical. More particularly, preferred alkyl or hydroxyalkyl radicals are those containing from one to four carbon atoms in the alkyl group.

It appears that the initial conversion of the aliphatic secondary amine containing at least one hydroxyethyl group yields 3-substituted oxazolidone-2, which at elevated temperatures and in the presence of a base, participates in a bimolecular reaction with the loss of carbon dioxide and the concurrent formation of N,N'-disubstituted piperazines.

Heretofore, prior investigators have established that amination of hydroxylated compounds by the condensation of hydroxy groups with primary or secondary amines can only be achieved at high temperatures in the presence of active dehydration catalysts.

In contrast to the drastic conditions employed by previous investigators, the process of this invention employs relatively mild reaction conditions and employs relatively inexpensive starting materials, thus providing a commercially attractive route for the production of disubstituted piperazines for use in the production of biologically active salts of penicillin, of polymeric quaternary salts of bacteriacidal potency and, for use in the production of liquid detergents and in the modification of soaps.

As set forth above, the process of this invention provides for the conjoint use of an elevated temperature and an elevated pressure. The minimum temperature necessary to provide significant yield of N,N'-disubstituted piperazines is a temperature in the range of 110° C. to 200° C. An elevated positive pressure of at least 150 pounds per square inch absolute is sufficient depending on the temperature employed. Generally, positive pressures in the range of from 150 to 1000 pounds per square inch absolute and preferably pressures in the range of from 200 to 600 pounds per square inch absolute can be employed. The pressure desired for the reaction may be the pressure which is derived mostly from the heating of the reactants in a closed reaction vessel or the pressure can be externally applied pressure derived from the imposition of any other gas such as, carbon dioxide or nitrogen, over the reaction medium. As a matter of practical convenience, however, it is preferred that the secondary amine be charged to an autoclave and pressured with carbon dioxide to effect the pressure desired.

In carrying out the process of this invention, the secondary amine containing at least one 2-hydroxyethyl group is employed either undiluted or diluted with suitable solvents such as water or diethylene glycol. Water is a preferred diluent because of its low cost, ease of removal from the products of the reaction and its excellent solvent power for both reactants and products.

The secondary amine containing at least one 2-hydroxyethyl group, alone or in solution, can be charged to an autoclave and carbon dioxide bubbled into the amine until a saturated solution is attained. If desired, the carbonate salt or the carbamate salt can be prepared in a separate operation and then charged to the autoclave, whereupon the reaction product of the amine and carbon dioxide (Equations I(a) and I(b) above) can then be heated to the desired temperature and pressure to allow the reaction to proceed. Although the amine and carbon dioxide can be reacted in any desired mole ratio, practical success, from a yield point of view, requires that equivalent to equimolar proportions of reactants be employed.

The following examples will serve to illustrate the practice of the invention.

EXAMPLE 1

*Preparation of N,N'-dimethylpiperazine*

To a mixture of 360 grams (4.8 moles) N-methylethanolamine and 1100 grams water was added gaseous carbon dioxide at a temperature of 30° C. until the solution was saturated with carbon dioxide; in this manner, 150 grams (3.4 moles) was absorbed. The saturated solution was charged to a stainless steel pressure vessel and heated at 160–170° C. for 20 hours at a pressure of 500–580 pounds per square inch absolute. After cooling, the crude reaction mixture was discharged and fractionally distilled. The product N,N'-dimethylpiperazine was recovered as an aqueous concentrate which was freed of water by azeotropic distillation with benzene. The product, N,N'-dimethylpiperazine, was recovered by fractionally distilling the benzene concentrate and was characterized by the following properties:

Physical state, 25° C _____ Water-white liquid
Boiling Point at 750 mm. Hg, ° C.:
   Found _____ 130–131
   Literature value _____ 131
Equivalent weight, by titration:
   Found _____ 58
   Calculated _____ 57.1
Nitrogen content, percent by weight:
   Found _____ 24.42
   Calculated _____ 24.5
Decomposition temperature of picrate, ° C.:
   Found _____ 280–290
   Literature value _____ 280
Specific gravity, 20/20° C _____ 0.856

Two hundred grams of N,N'-dimethylpiperazine were recovered, equivalent to a yield of 43 percent, based on the methylethanolamine originally charged.

EXAMPLE 2

*Preparation of N,N'-di-(2-hydroxyethyl) piperazine*

A twenty five percent solution of diethanolamine in water was saturated with carbon dioxide at 25° C. and the carbonated solution charged to a stainless steel autoclave and heated under pressure at a temperature of 145° C. to 150° C. for 12 hours. The crude reaction mixture was cooled and examined for unreacted diethanolamine. Only a trace of diethanol amine was recovered unchanged and over one-half of the diethanolamine was converted to an N,N'-di-(2-hydroxyethyl) piperazine, characterized by the following physical properties:

Physical state _____ White crystalline solid
Melting Point, ° C _____ 135
Boiling point at 0.15 mm. Hg, ° C _____ 141–142
Equivalent weight, by titration _____ 87.3
Nitrogen content, percent by weight:
   Calculated _____ 16.08
   Found _____ 16.1

EXAMPLE 3

*Preparation of N,N'-di-(2-hydroxyethyl) piperazine*

A twenty-five percent solution of diethanolamine in water was saturated with carbon dioxide at 25° C. and the solution sealed in a stainless steel pressure autoclave. After heating at the desired temperature for eight hours, the autoclave was cooled to 25° C. and the contents discharged and fractionally distilled to determine the amount of diethanolamine unchanged and the amount converted to N,N'-di-(2-hydroxyethyl) piperazine and other high-boiling, nitrogenous coproducts. The data from several laboratory preparations are listed on the following table:

CONVERSION OF DIETHANOLAMINE IN THE PRESENCE OF CARBON DIOXIDE

| Experiment No. | Temperature, °C. | Initial pressure, p. s. i. (gauge) | Diethanolamine Converted, percent | N,N'-Di-(2-Hydroxyethyl) piperazine, percent yield |
| --- | --- | --- | --- | --- |
| 1 | 100 | 180 | Nil | Nil |
| 2 | 110 | 195 | 5 | 4.5 |
| 3 | 120 | 250 | 22 | 18 |
| 4 | 135 | 325 | 56 | 43 |
| 5 | 150 | 520 | 92 | 74 |
| 6 | 175 | 600 | 97 | 72 |

EXAMPLE 4

*Preparation of N,N'-diethylpiperazine*

The aqueous reaction product of N-ethylethanolamine and carbon dioxide, weighing 1538 grams and containing 4 moles of N-ethylethanolamine and 2.2 moles of carbon dioxide, was charged to a 3-liter autoclave and heated under pressure of 500–550 pounds per square inch absolute for twenty hours at 150° C.–160° C. The crude make was separated by fractional distillation, the desired product being recovered over a wide boiling range and contaminated with water. Water was removed from the amine-water fraction by azeotropic distillation with benzene and the amine recovered as a close boiling fraction which was characterized by the following properties:

Boiling Point, ° C. at 748 mm _____ 174
Specific gravity, 20/20° C _____ 0.8564
Refractive index 25° C _____ 1.4517
Equivalent weight, by titration:
   Found _____ 70.8
   Calculated _____ 71.1
Nitrogen content, by Kjeldahl method:
   Found _____ 19.75
   Calculated _____ 19.70

The picrate of the product, N,N'-diethylpiperazine was prepared by adding the amine in ethanol to an excess of picric acid in the same solvent. The picrate salt was isolated as a yellow crystalline solid, melting, with decomposition, at 280–283° C.

The product fraction weight 95 grams, a 33.4 percent yield of N,N'-diethylpiperazine, based on the N-ethylethanolamine charged.

EXAMPLE 5

*Preparation of N,N'-Dibutylpiperazine*

An aqueous solution of N-butylethanolammonium carbonate was prepared by reacting 92.5 grams (2.1 moles) carbon dioxide and 234 grams (2 moles) N-butylethanolamine. The carbonate solution was charged to a pressure autoclave and heated, under an absolute pressure 800 pounds per square inch at 220–230° C. for 20 hours. The autoclave was cooled to 25° C. and the contents discharged to a laboratory still where water and unconverted N-butylethanolamine were recovered by distillation. Using a high reflux ratio, a product fraction, boiling in the range of 118–127° C. at 10 mm. of Hg, was isolated.

This fraction, 82 grams, was carefully redistilled to isolate a "hearts" fraction of N,N'-dibutylpiperazine, having a boiling point of 126–128° C. at 12 mm.; equivalent weight by titration 99.4 (theoretical value 99.1); organic nitrogen content of 14.1 percent (theoretical value 14.1 percent); picrate salt melting with decomposition at 270–271° C. N,N'-dibutylpiperazine is a water-white, mobile liquid, sparingly soluble in water and possessing a mild amine odor.

What is claimed is:

1. A process for the production of N,N'-disubstituted piperazines which comprises heating a reaction mixture comprising carbon dioxide and a saturated lower aliphatic secondary amine containing at least one 2-hydroxyethyl group to an elevated temperature in the range of 110° C. to 200° C. under a superatmospheric pressure of from 150 to 1000 pounds per square inch absolute.

2. A process for the production of N,N'-disubstituted piperazines which comprises reacting carbon dioxide and a saturated lower aliphatic secondary amine containing at least one 2-hydroxyethyl group, heating the resultant reaction mixture to a temperature in the range of 110° C. to 200° C. and under absolute pressure of from 150 to 1000 pounds per square inch.

3. A process for the production of N,N'-di-(lower hydroxyalkyl) piperazines which comprises heating a reaction mixture comprising carbon dioxide and an N-lower hydroxyalkyl ethanolamine to a temperature in the range of 110° C. to 200° C. and under an absolute pressure of from 150 to 1000 pounds per square inch.

4. A process for the production of N,N'-di-lower-alkyl piperazines which comprises heating a reaction mixture comprising carbon dioxide and an N-lower-alkyl ethanolamine to an elevated temperature in the range of 110° C. to 200° C. and under an absolute pressure of from 150 to 1000 pounds per square inch.

5. A process for the production of N,N'-disubstituted piperazines which comprises heating a reaction mixture comprising carbon dioxide and an aliphatic secondary ethanol amine having the formula:

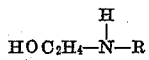

wherein R represents a member selected from the group consisting of lower alkyl and lower hydroxyalkyl groups, to an elevated temperature in the range of 110° C. to 200° C. and under an absolute pressure of from 150 to 1000 pounds per square inch.

6. A process for the production of N,N'-dimethyl piperazine which comprises heating a reaction mixture comprising carbon dioxide and N-methyl ethanolamine to an elevated temperature in the range 110° C. to 200° C. and under an absolute pressure of from 150 to 1000 pounds per square inch.

7. A process for the production of N,N'-diethyl piperazine which comprises heating a reaction mixture comprising carbon dioxide and N-ethyl ethanolamine to an elevated temperature of at least 110° C. and under an absolute pressure of from 150 to 1000 pounds per square inch.

8. A process for the production of N,N'-dibutyl piperazine which comprises heating a reaction mixture comprising carbon dioxide and N-butyl ethanolamine to an elevated temperature of at least 110° C. and under an absolute pressure of from 150 to 1000 pounds per square inch.

9. A process for the production of N,N'-di-(2-hydroxyethyl) piperazine which comprises heating a reaction mixture comprising carbon dioxide and diethanolamine to an elevated temperature in the range of from 110° C. and under an absolute pressure of at least 150 to 1000 pounds per square inch.

10. A process for the production of N,N'-disubstituted piperazines which comprises heating a reaction mixture comprising carbon dioxide and an aqueous solution of a saturated lower aliphatic secondary ethanolamine to an elevated temperature of from 110° C. to 200° C. and under an absolute pressure of from 150 to 1000 pounds per square inch.

11. A process for the production of N,N-disubstituted piperazines which comprises heating a reaction mixture comprising carbon dioxide and a diethylene glycol solution of a saturated lower aliphatic secondary ethanolamine to an elevated temperature of from 110° C. to 200° C. and under an absolute pressure of from 150 to 1000 pounds per square inch.

References Cited in the file of this patent

UNITED STATES PATENTS

| | | |
|---|---|---|
| 2,636,033 | Malkemus | Apr. 21, 1953 |

FOREIGN PATENTS

| | | |
|---|---|---|
| 817,913 | Germany | Oct. 22, 1951 |
| 917,784 | Germany | Sept. 13, 1954 |
| 622,955 | Great Britain | May 10, 1949 |

UNITED STATES PATENT OFFICE
CERTIFICATE OF CORRECTION

Patent No. 2,868,791                                                January 13, 1959

Arthur B. Steele

It is hereby certified that error appears in the printed specification of the above numbered patent requiring correction and that the said Letters Patent should read as corrected below.

Column 5, lines 24 and 30, for "of at least 110° C.", each occurrence, read -- in the range of 110° C. to 200° C. --; column 6, line 5, after "110°C." insert -- to 200° C. --.

Signed and sealed this 16th day of June 1959.

(SEAL)
Attest:

KARL H. AXLINE
Attesting Officer

ROBERT C. WATSON
Commissioner of Patents